US011039684B2

United States Patent
Bowman

(10) Patent No.: US 11,039,684 B2
(45) Date of Patent: Jun. 22, 2021

(54) ARM-BASED SIT-STAND WORKSTATION

(71) Applicant: Innovative Office Products, LLC, Easton, PA (US)

(72) Inventor: Stephen J. Bowman, Saylorsburg, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 16/433,561

(22) Filed: Jun. 6, 2019

(65) Prior Publication Data

US 2019/0374025 A1  Dec. 12, 2019

Related U.S. Application Data

(60) Provisional application No. 62/681,291, filed on Jun. 6, 2018.

(51) Int. Cl.
*A47B 21/02* (2006.01)
*F16M 13/02* (2006.01)
*A47B 21/04* (2006.01)

(52) U.S. Cl.
CPC .............. *A47B 21/02* (2013.01); *A47B 21/04* (2013.01); *F16M 13/022* (2013.01); *F16M 2200/025* (2013.01); *F16M 2200/041* (2013.01); *F16M 2200/063* (2013.01)

(58) Field of Classification Search
CPC ................................................ Y10S 248/919
USPC .... 108/50.01, 50.02, 90, 145; 248/917, 918, 248/919, 920, 921, 922, 923
See application file for complete search history.

(56) References Cited

U.S. PATENT DOCUMENTS

| | | | | |
|---|---|---|---|---|
| 4,844,387 A * | 7/1989 | Sorgi | ................... | F16M 11/10 108/5 |
| 5,758,849 A * | 6/1998 | Bui | ........................ | A47B 9/10 248/125.1 |
| 5,953,776 A * | 9/1999 | Sanders | ............... | A61B 6/0457 108/145 |
| 6,012,693 A * | 1/2000 | Voeller | ................. | F16M 11/048 248/279.1 |
| 6,038,986 A * | 3/2000 | Ransil | ..................... | A47B 9/02 108/145 |
| 6,712,008 B1 * | 3/2004 | Habenicht | .......... | A47B 21/0314 108/147 |
| 7,997,211 B2 * | 8/2011 | Peterson | ................ | F16M 11/10 108/152 |

(Continued)

OTHER PUBLICATIONS

Ergotron WorkFit-A, Dual Monitor with Worksurface, [online], [Retrieved on Jun. 7, 2019], Retrieved from the internet: <https://www.ergotron.com/en-us/products/product-details/24-316#/>.

(Continued)

*Primary Examiner* — Jose V Chen
(74) *Attorney, Agent, or Firm* — Design IP

(57) ABSTRACT

An arm-based sit-stand workstation is disclosed in which a height-position of the attached workstation portion is adjustable via adjustment of the position of the articulating arm. The workstation comprises a release mechanism that allows the workstation to be locked in a non-adjustable height configuration and also be placed in an unlocked configuration in which a height position of the workstation portion can be adjusted without constant user actuation of the release mechanism during adjustment.

18 Claims, 10 Drawing Sheets

(56) References Cited

U.S. PATENT DOCUMENTS

| | | | | |
|---|---|---|---|---|
| 8,051,782 | B2* | 11/2011 | Nethken | A47B 21/02 108/50.01 |
| 8,191,487 | B2* | 6/2012 | Theesfeld | A47B 57/06 108/106 |
| 8,366,060 | B2* | 2/2013 | Hung | F16M 11/105 248/124.1 |
| 8,826,831 | B2* | 9/2014 | Hazzard | A47B 21/02 108/50.01 |
| 9,366,379 | B2 | 6/2016 | Bowman et al. | |
| 9,888,766 | B2* | 2/2018 | Chuang | A47B 9/16 |
| 9,958,108 | B2 | 5/2018 | Bowman et al. | |
| 10,004,327 | B2* | 6/2018 | McRorie, III | A47B 21/02 |
| 10,047,532 | B2* | 8/2018 | Rau | E04G 21/0436 |
| 10,111,518 | B2* | 10/2018 | Blackburn | A47B 21/02 |
| 10,264,877 | B2* | 4/2019 | Hu | A47B 9/02 |
| 10,323,791 | B1* | 6/2019 | Liu | F16B 2/065 |
| 10,517,390 | B2* | 12/2019 | Xiang | A47B 9/16 |
| 2001/0018882 | A1* | 9/2001 | Recknagel | A47B 21/0314 108/50.01 |
| 2004/0094072 | A1* | 5/2004 | Fabian | F16M 11/10 108/50.01 |
| 2005/0022699 | A1* | 2/2005 | Goza | A47B 21/0314 108/50.01 |
| 2007/0266912 | A1* | 11/2007 | Swain | A47B 9/02 108/145 |
| 2014/0197289 | A1* | 7/2014 | Chen | F16M 13/022 248/214 |
| 2015/0289641 | A1* | 10/2015 | Ergun | A47B 13/003 108/42 |
| 2018/0020825 | A1* | 1/2018 | Hung | A47B 21/02 108/31 |

OTHER PUBLICATIONS

Humanscale QuickStand Lite, [online], [Retrieved on Jun. 7, 2019], Retrieved from the internet: URL: <https://www.humanscale.com/products/?CFID=29824026&CFTOKEN=90507843>.

Kelly Sit-Stand Workstation with Dual Monitor Arm Supports, [online], [Retrieved on Jun. 7, 2019], Retrieved from the internet: URL: <http://www.kellyrest.com/sitstandworkstation.aspx>.

Monumental Mounts Sit Stand Combo, [online], [Retrieved on Jun. 7, 2019], Retrieved from the internet: URL: <https://monumentalmounts.com/products/sit-stand-combo-workstation-wall-mount-system-amrlaws?utm_medium=cpc&utm_source=googlepla&variant=1774339329&gclid=EAIaIQobChMIwuy-0PKt2wIVRwOGCh3WLwhAEAYYAyABEglX_PD_BwE).

Mount-It? Sit Stand Laptop Mount Arm, [online], [Retrieved on Jun. 7, 2019], Retrieved from the internet: URL: <https://www.amazon.com/Mount-Adjustable-Workstation-Notebooks-Capacity/dp/B06WW53FTN>.

* cited by examiner

ARM-BASED SIT-STAND WORKSTATION

BACKGROUND

Arm-based (i.e., arm-mounted) sit-stand workstations that can support one or more electronic devices therefrom are known in the art. The known prior art devices are limited in their adjustability. Accordingly, there is a need for an improved sit-stand workstation that addresses these and other shortcomings of the prior art devices.

SUMMARY OF THE INVENTION

In view of the foregoing background, an arm-based sit-stand workstation is disclosed. In one embodiment, the workstation includes a base that extends upwardly from a support surface; an arm including a first end, a second end, and an elongate body extending between the first and second ends, the first end being connected to the base, the arm being configured to adjust a height of the second end from the support surface between a raised position and a lowered position, the height of the second end at the raised position being greater than the height of the second end at the lowered position; a extending and retracting actuator having a proximal end, a distal end, and an adjustable length between the proximal end and the distal end, the proximal end being connected to the first end of the arm and the distal end being connected to the second end of the arm, the extending and retracting actuator being extendable and retractable between a first length and a second length; and a workstation portion attached to the second end of the arm, the workstation portion comprising at least one worksurface, at least one display support bracket adapted to support an electronic display therefrom, and a manually operated toggle arm operably connected to the extending and retracting actuator, the toggle arm enabling a user to switch the extending and retracting actuator between a locked configuration and an unlocked configuration, the unlocked configuration allowing the extending and retracting actuator to move between the first and second lengths. The first length of the extending and retracting actuator corresponds to the raised position of the second end of the arm and the second position of the extending and retracting actuator corresponds to the lowered position of the arm. The workstation portion also includes at least one detent for holding the toggle arm in one of the locked configuration and the unlocked configuration.

In another embodiment, the workstation includes a base mount that is supportable from a support surface; a base portion that extends upwardly from the base mount; an articulating arm portion connected at a first end thereof to the base portion, the articulating arm portion comprising an upper channel, a lower channel, a first endcap, and a second endcap connected together in a parallelogram shape, and an extension and retraction device connected between one of the upper channel and the lower channel and one of the first endcap and the second endcap; a workstation portion attached to a second end of the articulating arm portion, the workstation portion comprising at least one column, at least one worksurface attached to the column, and at least one display support apparatus attached to the column, the at least one display support apparatus adapted to support an electronic display therefrom; and a release mechanism connected between the workstation portion and the extension and retraction device. The release mechanism can be placed into and maintained in an unlocked configuration, such that a height position of the workstation portion can be adjusted by a user without constant actuation of the release mechanism by the user during height adjustment.

In yet another embodiment, a base that extends upwardly from a support surface, the base including a base mount for attaching to a support surface and a pole extending upwardly from the base mount; an articulating arm comprising an upper channel, a lower channel, a first endcap, and a second endcap connected together in a parallelogram shape, the second endcap being pivotally attached to the upper end of the pole of the base, the articulating arm being configured to articulate about the second endcap to adjust a height of the first endcap between a raised position and a lowered position, the raised position having a height from the support surface that is greater than a height of the lowered position; a gas cylinder having a first end and a second end, the first end being connected to the lower channel and the second end being connected to the second endcap, the gas cylinder being extendable and retractable between a first position and a second position, the first position corresponding to the raised position of the first endcap and the second position corresponding to the lowered position of the first endcap, the gas cylinder including a depressible release pin for switching the gas cylinder between a locked configuration and an unlocked configuration, wherein the locked configuration prevents the gas cylinder from moving between the first and second positions and the unlocked configuration allows the gas cylinder to move between the first and second position; a workstation portion attached to the first endcap of the articulating arm, the workstation portion comprising at least one column, at least one worksurface attached to the at least one column, a tray attached to the at least one worksurface, and at least one display support apparatus attached to the at least one column, the at least one display support apparatus being adapted to support an electronic display therefrom; a toggle arm connected to the workstation portion, the toggle arm having a handle end and an operating end opposite the handle end, the toggle arm extending through a slot formed in the tray with the handle end of the toggle arm being located outside of the tray and the operating end of the toggle arm being located inside the tray, the slot of the tray including a first notch and a second notch, each of the first notch and the second notch being sized and shaped to receive and hold a portion of the toggle arm therein; and a release mechanism comprising a release cable and a release arm, the release arm being located proximate to the release pin of the gas cylinder and the release cable extending from the tray of the workstation portion through the articulating arm to the second end of the gas cylinder, the release cable connected to the operating end of the toggle arm at a first end and the release arm at a second end. The gas cylinder is in the locked configuration when the toggle arm is located in the first notch, and the operating end of the toggle arm places the release cable in tension when the toggle arm is moved from the first notch to the second notch, thereby causing the release cable to pull the release arm toward and depress the release pin of the gas cylinder, placing the gas cylinder in the unlocked configuration.

BRIEF DESCRIPTION OF THE DRAWINGS

For a more complete understanding of the present invention, reference is made to the following detailed description of embodiments considered in conjunction with the accompanying drawings, in which.

DETAILED DESCRIPTION OF THE PREFERRED EMBODIMENTS

Figure 1:
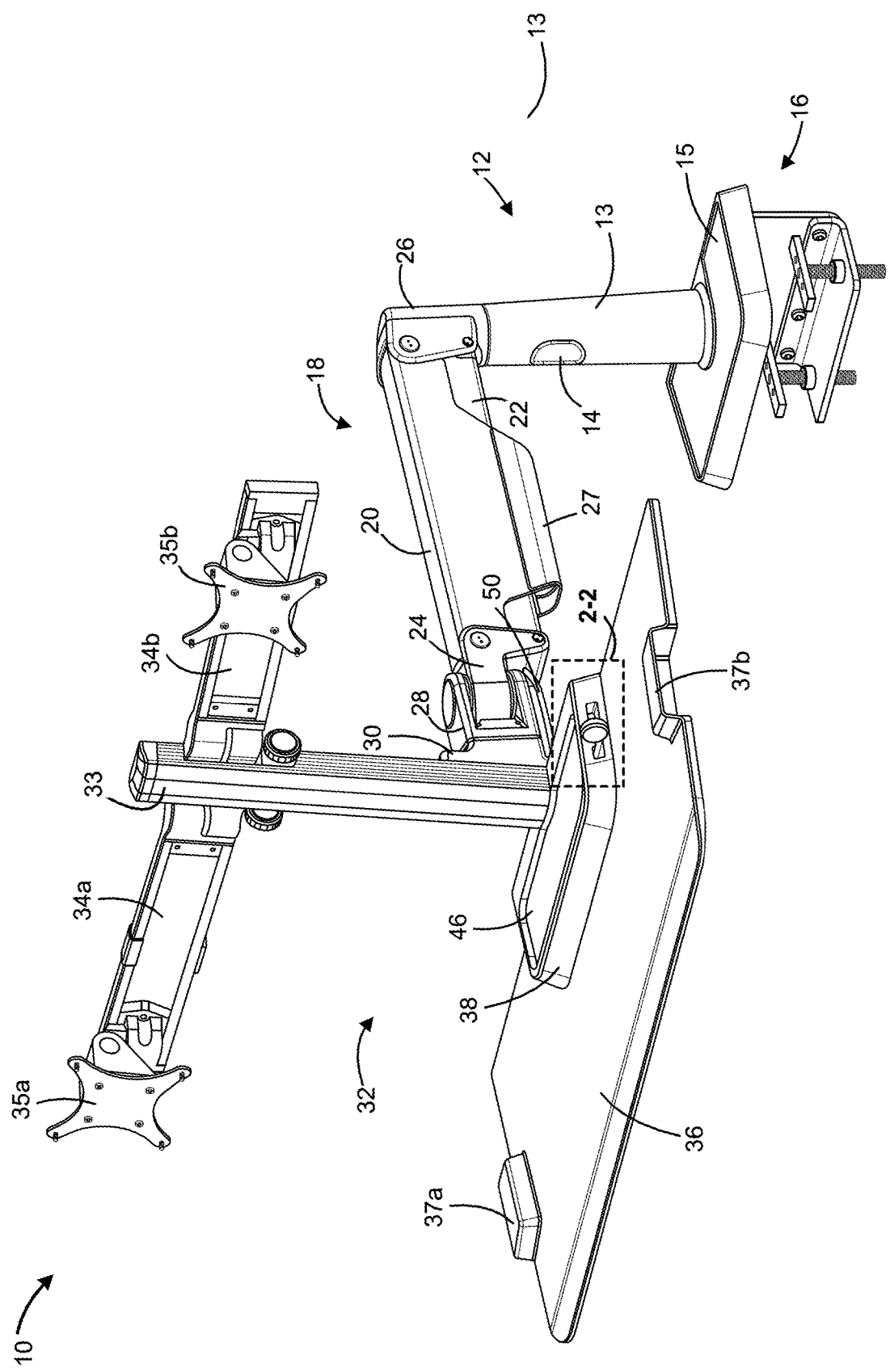
FIG. 1 is a front perspective view of an arm-based sit-stand workstation in accordance with an embodiment of the present invention.

The ensuing detailed description provides preferred exemplary embodiment(s) only, and is not intended to limit the scope, applicability, or configuration of the present disclosure. Rather, the ensuing detailed description of the preferred exemplary embodiment(s) will provide those skilled in the art with an enabling description for implementing the preferred exemplary embodiment(s) of the disclosure. It should be understood that various changes may be made in the function and arrangement of elements without departing from the spirit and scope of the disclosure, as set forth in the appended claims.

To aid in describing the disclosure, directional terms may be used in the specification and claims to describe portions of the present embodiment(s) (e.g., upper, lower, left, right, etc.). These directional definitions are merely intended to assist in describing the disclosure and claiming the invention and are not intended to limit the described disclosure or claimed invention in any way. In addition, reference numerals that are introduced in the specification in association with a drawing figure may be repeated in one or more subsequent figures without additional description in the specification in order to provide context for other features.

Referring generally to FIGS. 1-12, an embodiment of an arm-based (i.e., arm-mounted) sit-stand workstation 10 in accordance with the present disclosure is shown. In this embodiment, as shown in FIG. 1, the workstation 10 includes a base portion 12 comprising a pole 13 and a base mount 16 which is used to attach the workstation 10 to a support surface (not shown), such as a table, desk, or other generally-horizontal surface. In this embodiment, the pole 13 comprises a pair of cable slots (only cable slot 14 shown) for routing of device cables internal to the pole 13 for both aesthetic reasons and to prevent the device cables from snagging. As would be appreciated by a person having ordinary skill in the art, the base mount 16 comprises a clamping assembly for clamping around the edge of the support surface and a base plate 15 that sits on top of the support surface. It should be understood that, in alternate embodiments according to the present disclosure, any suitable type of base mount assembly could be used, including but not limited to a bolt-through mount, rail mount, or slat wall mount.

In this embodiment, the workstation 10 further comprises an arm portion 18 comprising an upper channel 20, lower channel 22, first endcap 24, and second endcap 26 connected together as a four-bar parallelogram linkage, as is standard in the relevant art. The arm portion 18 is articulable and provides the workstation 10 with its sit-stand capabilities, as further described below. A proximal end of the arm portion 18 is rotatable about the pole 13 about a generally vertical axis. In this embodiment, a cable router 27 is attached to an underside of the lower channel 22, though in alternate embodiments the cable router 27 could be supported elsewhere from the arm portion 18 or omitted entirely.

The workstation 10 further comprises a workstation portion 32 located at a front end of the workstation 10 distal to the base portion 12. The workstation portion 32 is attached to the arm portion 18 via a hinge 28 and a connecting block 30 that is attached between the hinge 28 and the workstation portion 32. The hinge 28 allows the workstation portion 32 to be rotated about a generally vertical axis at a distal end of the arm portion 18.

In this embodiment, the workstation portion 32 of the workstation 10 includes a column 33 attached to the connecting block 30, a pair of beam members 34a, 34b each of which being rotatably attached to the column 33, and a pair of display support brackets 35a, 35b, each of which is attached to a respective one of the beam members 34a, 34b. Each of the beam members 34a, 34b and display support brackets 35a, 35b are independently rotatable about a respective generally vertical axis to accomplish a "focal point adjustment" feature for each attached display, and a height location of each of the beam members 34a, 34b is adjustable about a height of the column 33. These features are described in detail in U.S. Pat. No. 9,958,108, issued 1 May 2018, the entire contents of which are incorporated herein by reference as if set forth in their entirety.

The workstation portion 32 of the workstation 10 further comprises a worksurface 36 having a pair of hand grips 37a, 37b extending upwardly therefrom. In alternate embodiments, the hand grips may be shaped differently or omitted entirely. The hand grips 37a, 37b allow the user to comfortably relocate the height of the workstation portion 32 into a desired sitting, standing, or other height and/or rotational position. As explained below in detail, an improvement described in the present disclosure is the ability to adjust the height of the workstation portion 32 without constant, simultaneous actuation of a release mechanism.

Figure 2:
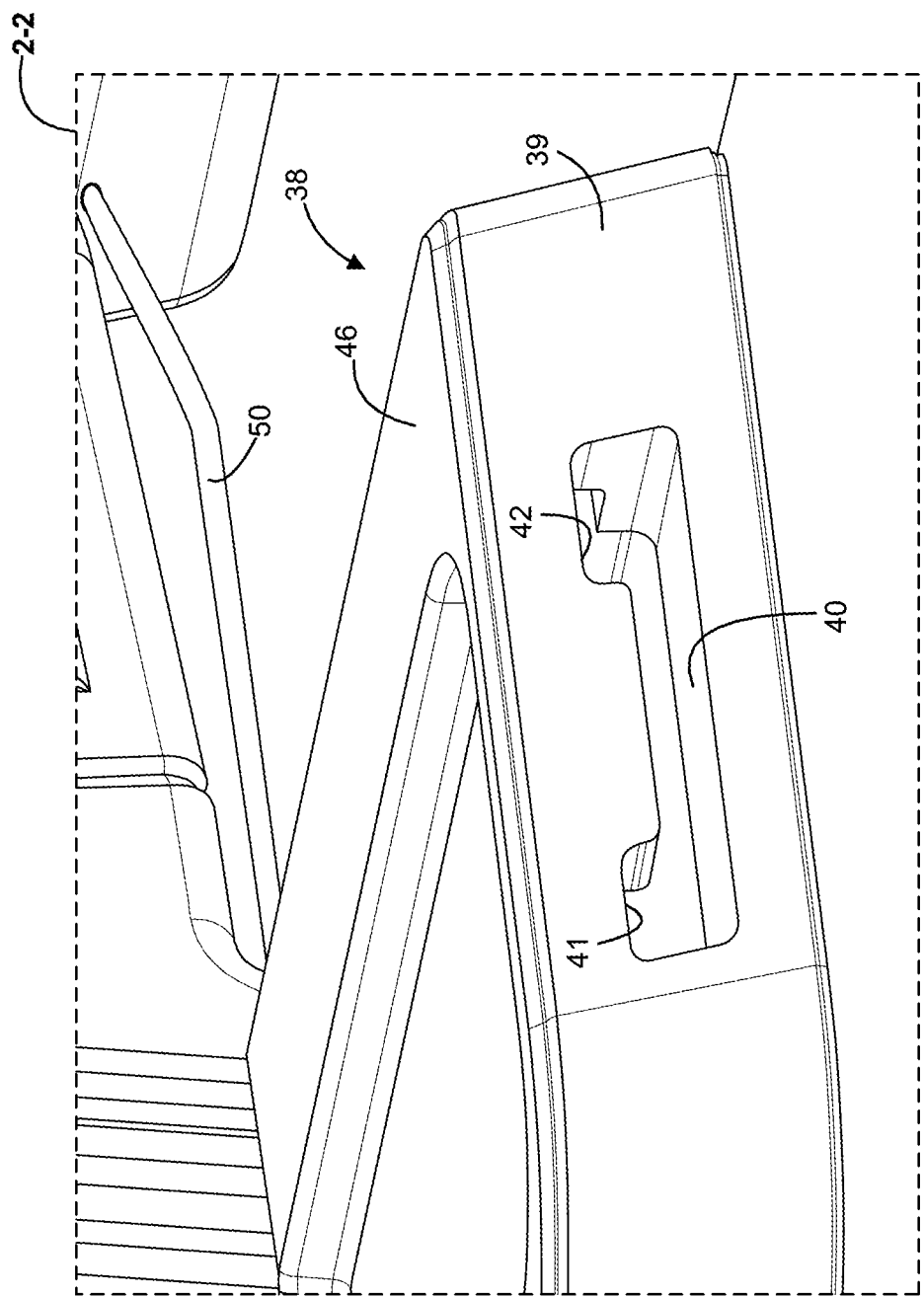
FIG. 2 is a magnified view of the sit-stand workstation of FIG. 1 at Section 2-2.

In this embodiment, the workstation portion 32 further comprises a tray 38 having a tray cover 46 that sits upon a tray wall 39. The tray cover 46 conceals a release mechanism 48 which is partially included within the tray 38, and provides a convenient location for a user to store personal items, beverages, or the like. As shown in FIG. 2, one side of the tray wall 39 includes a slot 40 having a first notch 41 and a second notch 42 for supporting two possible fixed locations of a toggle arm 55 of the release mechanism 48. For ease of disclosure, the toggle arm 55 is hidden from view in FIG. 2.

Figure 3:
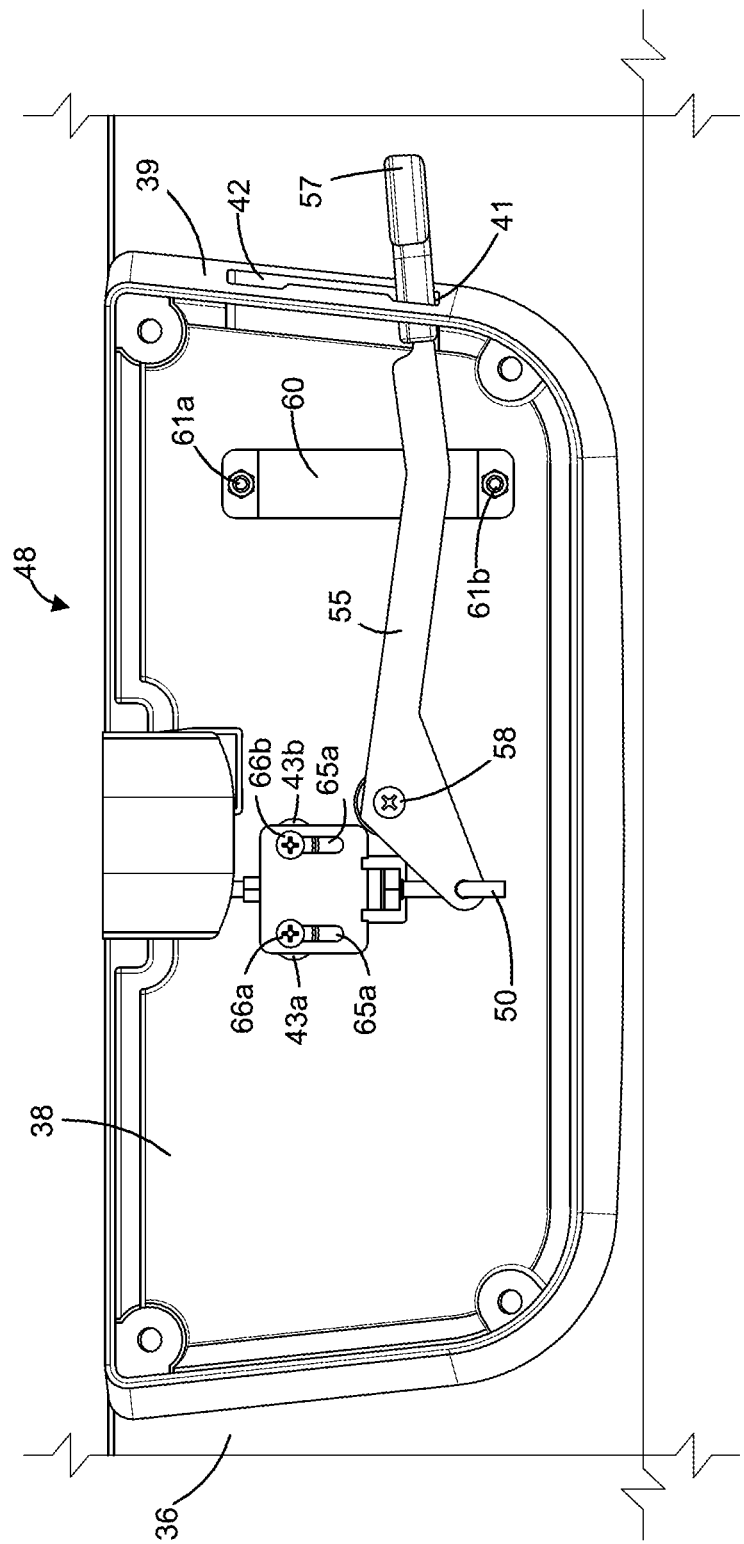
FIG. 3 is a top plan view of the tray of the workstation of FIG. 1 with the cover removed and the hand-operated switch thereof in a locked configuration.
Figure 4:
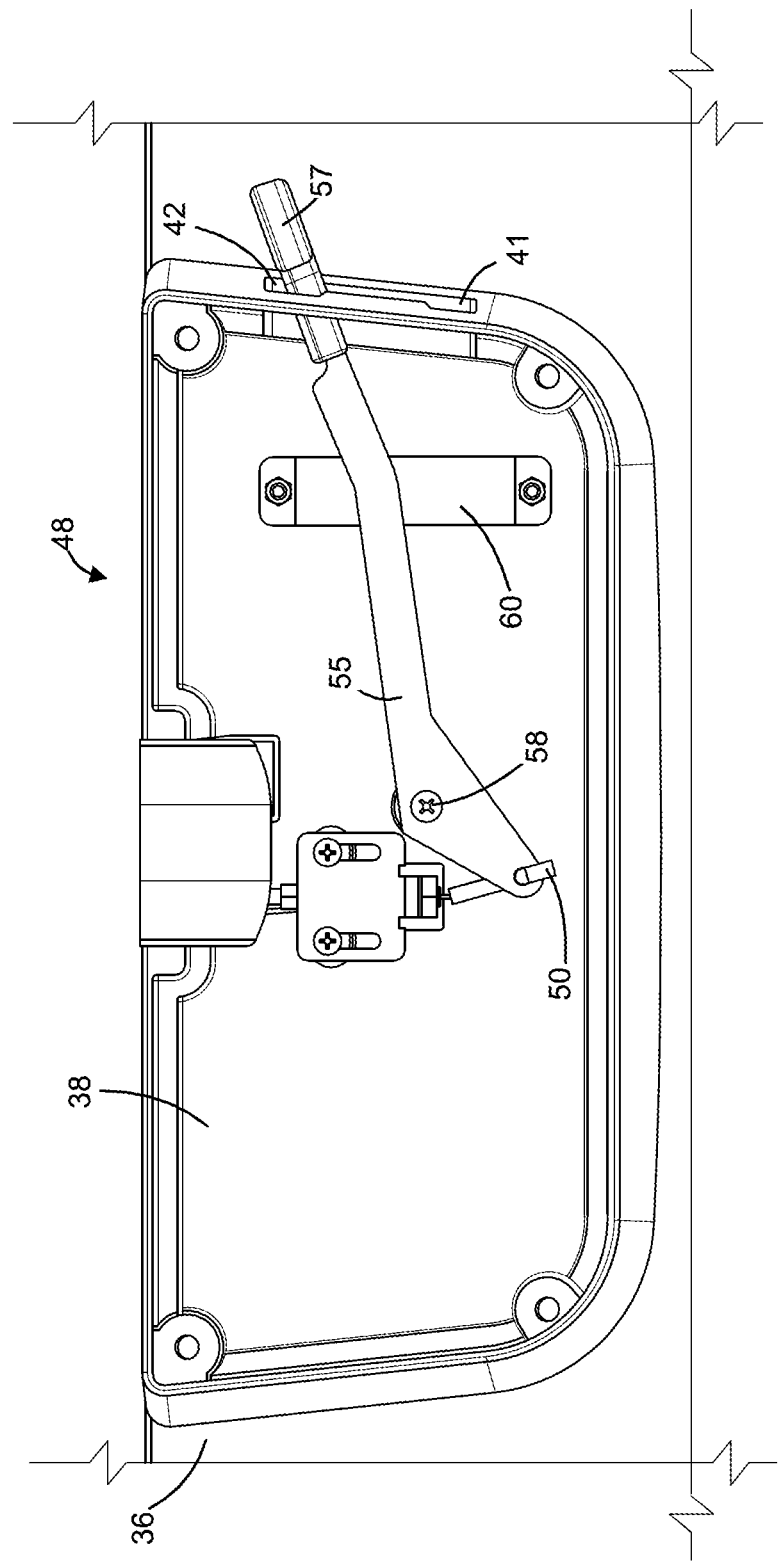
FIG. 4 is the view of FIG. 3 with the hand-operated switch in an unlocked configuration.
Figure 5:
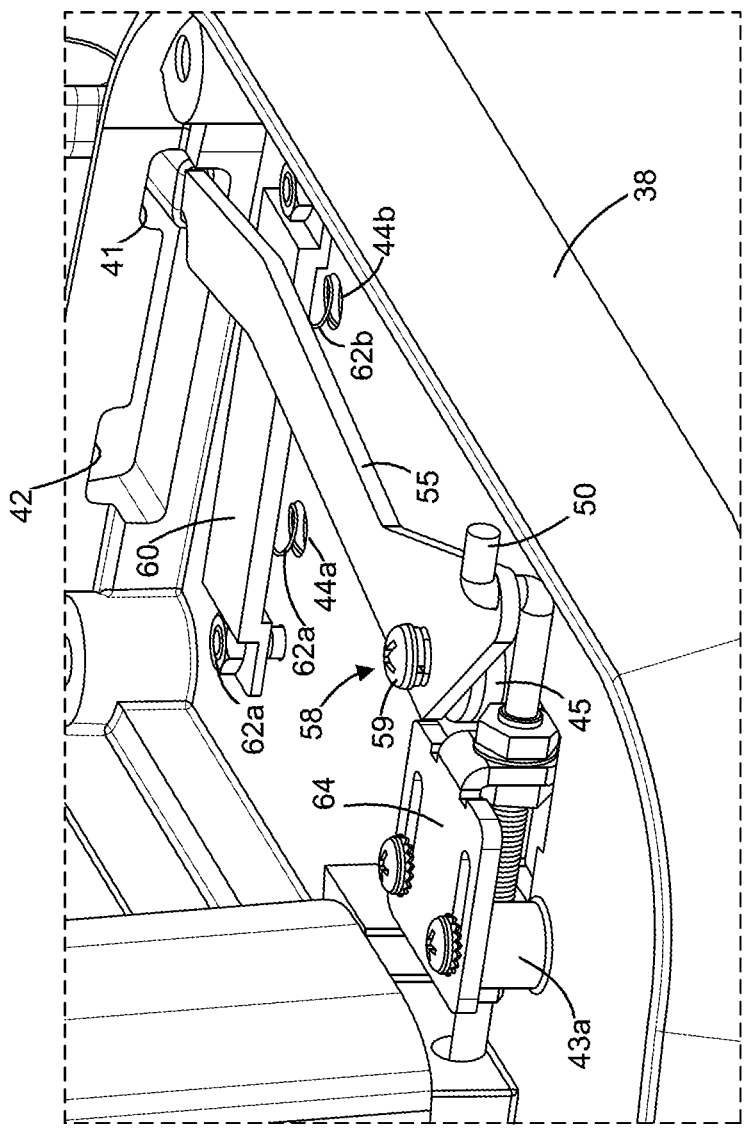
FIG. 5 is a perspective view of the tray shown in FIG. 3.

FIGS. 3-5 show various portions of the release mechanism 48 within the tray 38. In these figures, the tray cover 46 has been removed from view. In this embodiment, the toggle arm 55 extends through the slot 40 of the tray wall 39 and comprises a grip 57 at an end thereof which fits within either of the first notch 41 and second notch 42 in two different configurations of the release mechanism 48, as described below in further detail. The toggle arm 55 is pivotally attached to the tray 38 (which is fixedly attached to the worksurface 36) via a pivot 58, the pivot 58 comprising a fastener 59 that routes through a hole (not labeled) in the toggle arm 55 and secures within a bore 45 formed in the tray 38. The toggle arm 55 is thus free to rotate about the pivot 58.

As shown in FIGS. 3-5, the toggle arm 55 rests atop a floating block 60 that is movably attached to the tray 38 by a pair of fasteners 61a, 61b. A bottom end of each of a pair of springs 62a, 62b is fixed within a respective hole 44a, 44b in the tray 38, and the opposing, top end of each of the springs 62a, 62b is in contact with an underside of the floating block 60. In a default state, the floating block 60 (via the spring force applied thereto by the springs 62a,62b) presses upwardly on the toggle arm 55. In this way, the toggle arm 55 and grip 57 are held in place in a selected one of the first notch 41 and second notch 42 via the pressure applied thereto by the floating block 60 and springs 62a, 62b. In this manner, the notches 41, 42 serve as detents for arresting the lateral movement of the toggle arm 55, thereby holding the toggle arm 55 in the configuration associated with the chosen one of the first and second notches 41, 42.

To move the toggle arm 55 and grip 57 between the first notch 41 in which the release mechanism 48 is in a locked configuration (see FIGS. 3 and 5) and the second notch 42 in which the release mechanism 48 is in an unlocked configuration (see FIG. 4), the user must press downwardly on the grip 57 sufficiently to overcome the spring force being applied upwardly to the toggle arm 55 by the springs 62a, 62b such that the grip 57 is clear of the respective one of the notches 41, 42. The user then shifts the toggle arm 55 and grip 57 through the slot 40 to the other one of the notches 41, 42, before releasing the grip 57 so that the toggle arm 55 is again biased into one of the notches 41, 42 by the springs 62a, 62b acting upwardly on the floating block 60 and thus on the toggle arm 55.

As shown in FIGS. 3-5, an end of the toggle arm 55 opposite the grip 57 includes a hole 56 through which the end of a release cable 50 is secured. For purposes of discussion, it should be understood that significant portions of the length of the release cable 50 are protected within a conduit 51, and that the release cable 50 and conduit 51 are generally labeled and discussed interchangeably within this disclosure, with the exception being FIG. 8 and the accompanying portions of the disclosure below, wherein an end of the release cable 50 is shown exterior to the conduit 51 and these parts are labeled and discussed separately.

In a locked configuration of the release mechanism 48, as shown in FIG. 3, the grip 57 is located within the first notch 41 such that the end of the release cable 50 is not being displaced by the toggle arm 55. In this configuration, as further described below, the arm portion 18 is not height-adjustable because an extending and retracting actuator located within the arm portion 18 (see FIGS. 8 and 9) is in its locked, non-adjustable state. In an unlocked configuration of the release mechanism, as shown in FIG. 4, the toggle arm 55 has been rotated counterclockwise such that grip 57 is located within the second notch 42. In this configuration, the end of the release cable 50 has been pulled on by the toggle arm 55 as the hole 56 in the arm is pivoted away from a cable bracket 64 that helps to support the release cable 50. In this configuration, as further described below, the arm portion 18 is height-adjustable because the extending and retracting actuator, which is a gas cylinder 74 in this embodiment, has been placed in its unlocked (i.e., adjustable) state via movement of the release cable 50.

In known prior art sit-stand devices, a user must typically press/pull and continue to hold (i.e., constantly actuate) a release mechanism to place the extending and retracting actuator in an unlocked state such that the height of the device can be adjusted. For example, in the device disclosed in U.S. Pat. No. 9,366,379, issued 14 Jun. 2016—the entire contents of which are incorporated herein by reference as if set forth in their entirety—the user must depress and constantly hold a cylinder release mechanism to unlock a gas cylinder thereof while making any height adjustment to that device. On the contrary, in the workstation 10 according to the present disclosure, placement of the toggle arm 55 and grip 57 within the second notch 42 keeps the arm portion 18 in a permanently unlocked configuration such that the height of the arm portion 18 (and the attached workstation portion 32) may be adjusted without the need for the user to provide any constant force to some type of release mechanism. This permits the user to more easily and quickly make adjustments to the position of the workstation portion 32. As will be described in greater detail below, in this embodiment, the arm portion 18 is maintained in a selected height position even when the release mechanism 48 is in an unlocked state due to counterbalance forces being applied to the arm portion 18 by the gas cylinder 74 and a clevis assembly 78 that is located, in this embodiment, within the second endcap 26 and which is connected between the gas cylinder 74 and the second endcap 26.

Turning back to FIGS. 3-5, in this embodiment the release mechanism 48 further comprises the cable bracket 64 which holds an end of the release cable 50 in place within the tray 38. The cable bracket 64 is secured to the tray 38 via a pair of fasteners 66a, 66b that are each routed through a respective one of a pair of slots 65a, 65b located in the cable bracket 64 and into a respective one of a pair of bores 43a, 43b located in the tray 38. The amount of tension supplied to the end of the release cable 50 within the tray 38 may be adjusted by loosening the fasteners 66a,66b, adjusting the position of the cable bracket 64 by moving the fasteners 66a, 66b along the slots 65a, 65b, and retightening the fasteners 66a, 66b. U.S. Pat. No. 9,366,379, already incorporated herein by reference, teaches a similar type of adjustable cable bracket for tightening or loosening the amount of tension that is supplied by default to a release cable 50.

Figure 6:
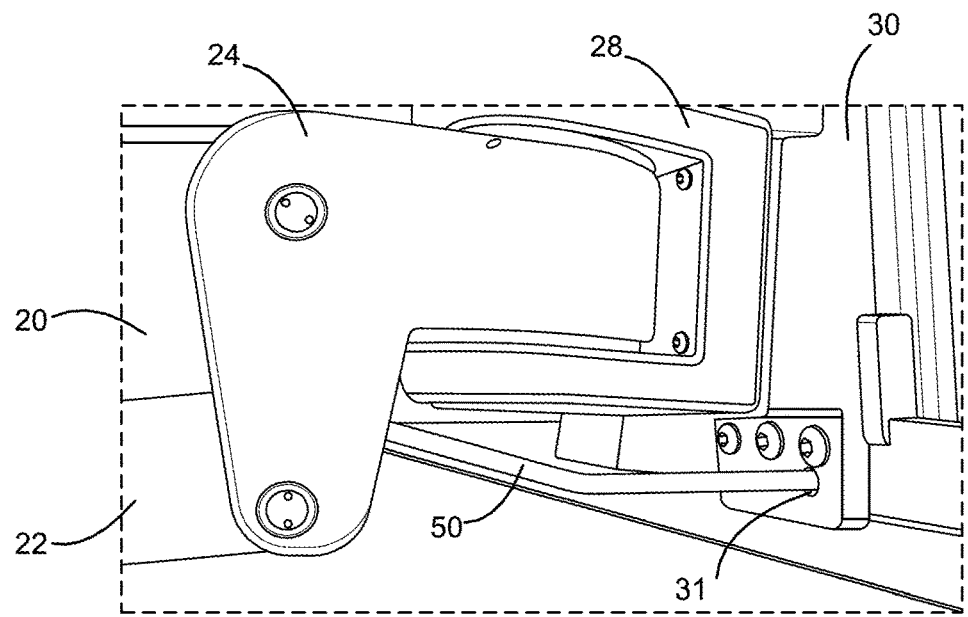
FIGS. 6 and 7 are perspective views of a release cable of the workstation shown in FIG. 1.
Figure 7:
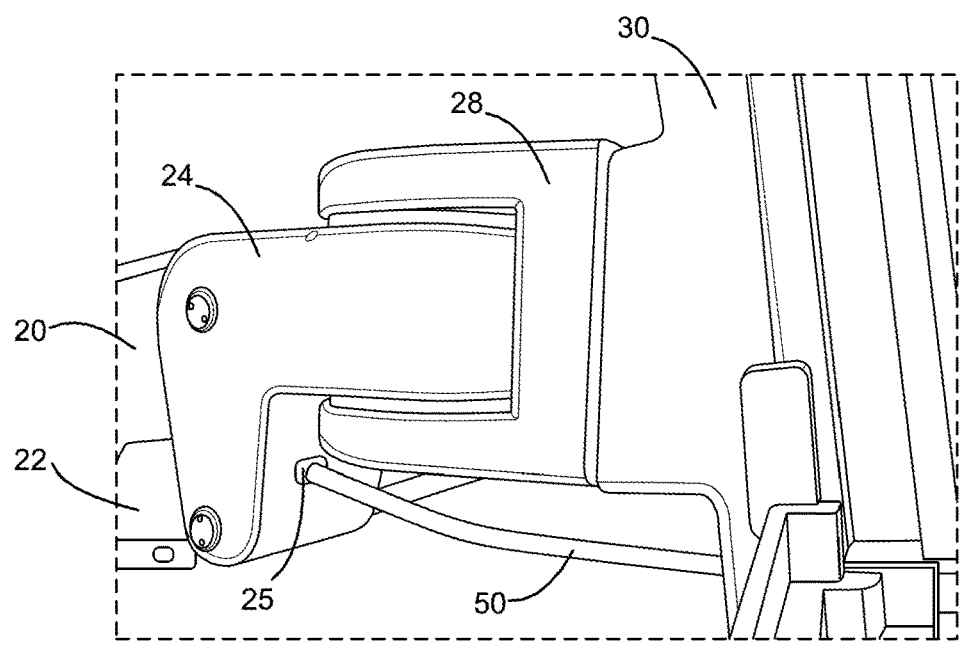

FIGS. 6 and 7 show routing of the release cable (shown in conduit 51) from the interior of the tray 38 to the interior of the arm portion 18. The release cable 50 passes out of the tray 38, through a hole 31 located in the connecting block 30, and into the arm portion 18 via a hole 25 located in the first endcap 24.

Figure 8:
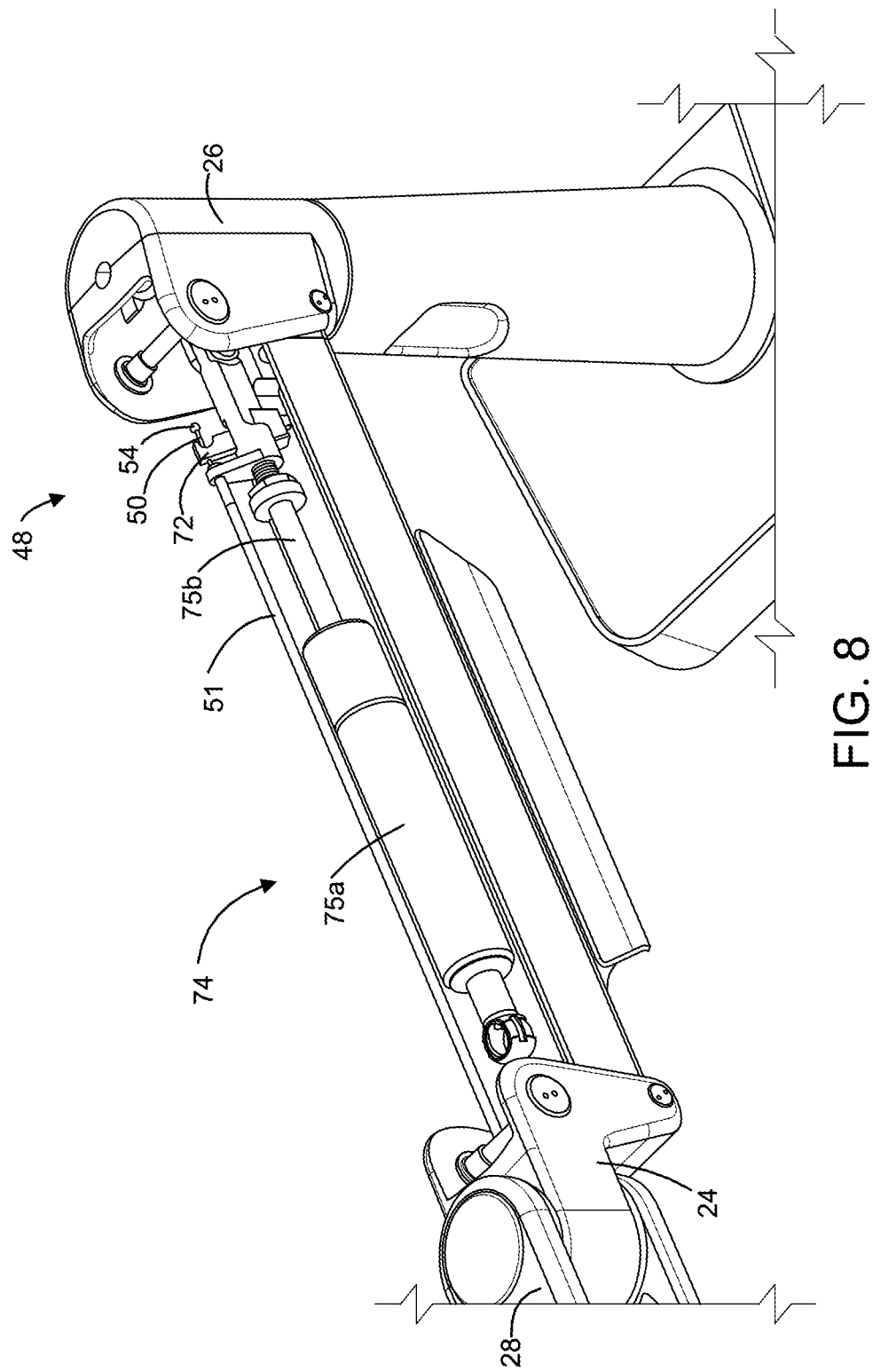
FIG. 8 is a top perspective view of the arm of the sit-stand workstation shown in FIG. 1, the arm having its top channel removed to show the extending and retracting actuator of the arm.
Figure 9:
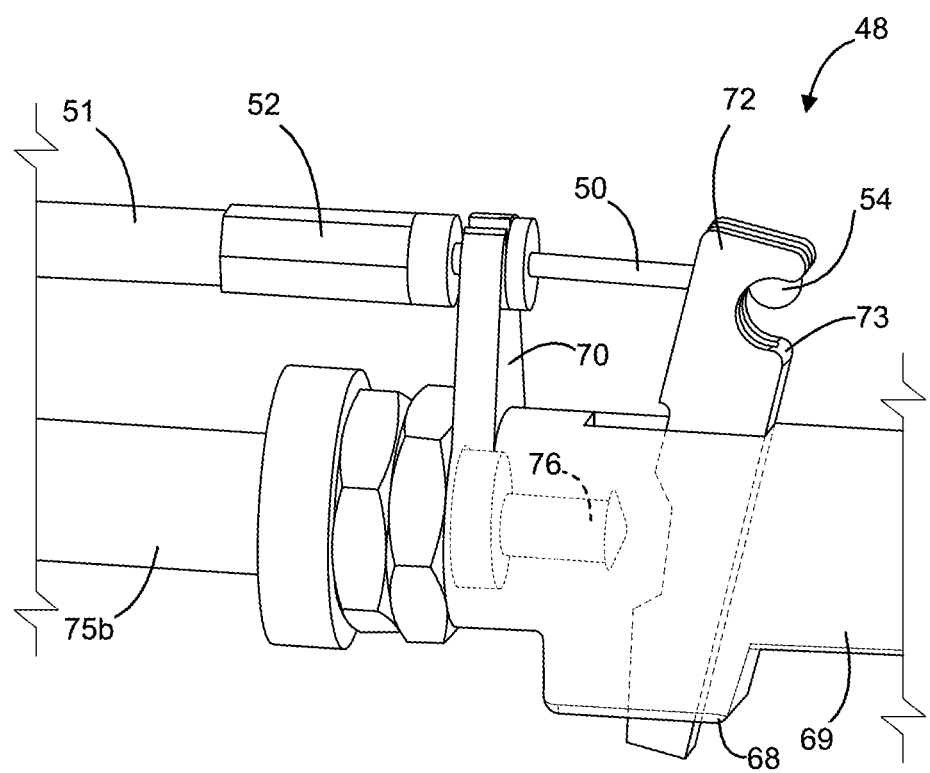
FIG. 9 is a perspective view of a release mechanism of the extending and retracting actuator shown in FIG. 8, the release mechanism including a release pin and a release arm being positioned fully or partially within the release block and shown in phantom.

FIGS. 8 and 9 show the arm portion 18 of the workstation 10 in which the gas cylinder 74 (i.e., the extending and retracting actuator of the arm portion 18) and the release cable 50 reside. The gas cylinder 74 includes a cylinder body 75a and a cylinder rod 75b that extends from and retracts into the cylinder body 75a. The release cable 50 is housed within the conduit 51, which extends from the first endcap 24 to a release block 68 of the release mechanism 48 located proximate the second endcap 26, and the release cable 50 extends through the conduit 51 and terminates at a movable release arm 72 of the release mechanism 48, which is shown in greater detail in FIG. 9. In one embodiment, the cylinder body 75a is affixed to the lower channel 22 proximate to the first endcap 24 and the cylinder rod 75b is fixedly attached to the release block 68 proximate to the second endcap 26 and the upper channel 22.

The release block 68 comprises a body portion 69 and a clip portion 70, which supports an end fitting 52 that is placed around the end of the release cable 50 after the conduit 51 terminates, so that the release cable 50 is held firmly in place such that an end of the release cable 50 extends outwardly from the end fitting 52. Fixed to the end of the release cable 50 is a ball 54 that is placed within a notched portion 73 in the release arm 72 to firmly secure the end of the release cable 50 to the release arm 72.

The cylinder rod 75b further comprises a release pin 76 (shown in phantom in FIG. 9) located at an end thereof, which is located within the body portion 69 of the release block 68. The release pin 76, when depressed, unlocks the cylinder rod 75b so that an effective length of the cylinder rod 75b can be adjusted. When the release cable 50 is pulled via placement of the toggle arm 55 into its unlocked configuration, the release cable 50 pulls on the release arm 72 via the ball 54, which acts to rotate the release arm 72 within the release block 68, thus applying pressure to the release pin 76 and freeing up the cylinder rod 75 so that its effective length may be adjusted. This allows the user to adjust the height of the distal end of the arm portion 18, and thus the height position of the workstation portion 32 of the workstation 10.

Figure 10:
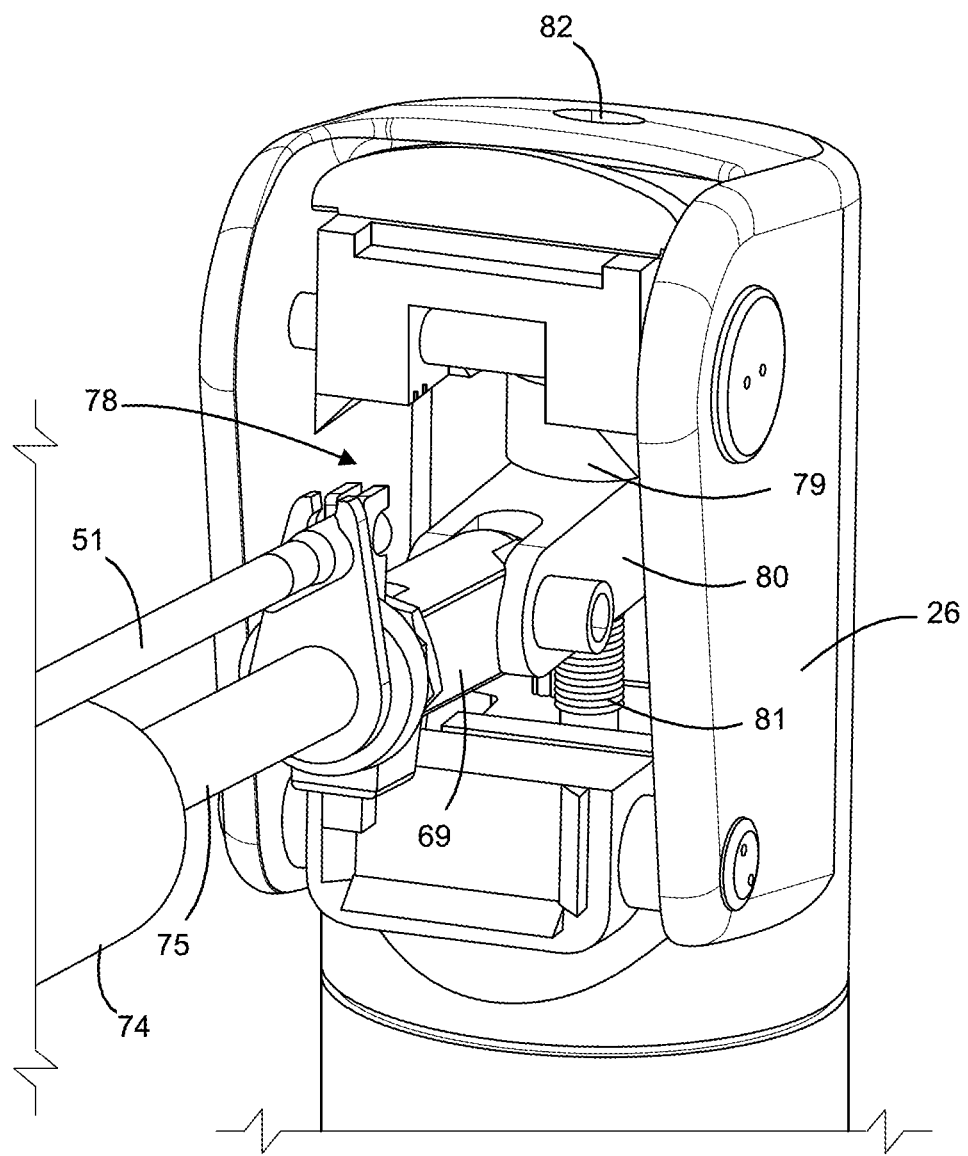
FIG. 10 is a perspective view of a clevis assembly housed within an endcap of the arm of a sit-stand workstation constructed in accordance with an embodiment of the present invention.

FIG. 10 shows the interior of the second endcap 26, which includes a clevis assembly 78 comprising a clevis 80, spacer 79, and a threaded rod 81 running therethrough. Adjustable clevis assemblies, such as the one described herein, are known in the art, and are used to adjust the amount of force that is applied to a gas cylinder such that loads of different masses may be counterbalanced (i.e., supported in a static height position without upward or downward movement) by an arm assembly. The entire disclosure of U.S. Pat. No. 7,540,457, issued 2 Jun. 2009, which teaches the concept of using an adjustable-force clevis assembly in a four-bar linkage articulating arm, is incorporated by reference herein as if set forth in its entirety. In the present embodiment, the spacer 79 is used to limit the range of motion of the clevis 80, which serves as a cylinder adjustment nut, along the axial length of the threaded rod 81. An end of the threaded rod 81 is accessible through an opening 82 in the exterior of the second endcap 26, so that the threaded rod 81 may be rotated to adjust the location of the clevis 80 along the axial length of the threaded rod 81, thus adjusting the amount of counterbalancing force that is supplied through the body portion 69 of the release block 68 to the gas cylinder 74, and thus to the arm portion 18. The counterbalancing forces that are supplied to the arm portion 18 are sufficient to support a full range of masses that would be expected to be attached to the workstation portion 32, such that a user may choose to use the workstation 10 in its unlocked configuration at all times. If desired, this allows for the position of the workstation 10 to be quickly and easily readjusted without need to actuate the release mechanism 48.

Figure 11:
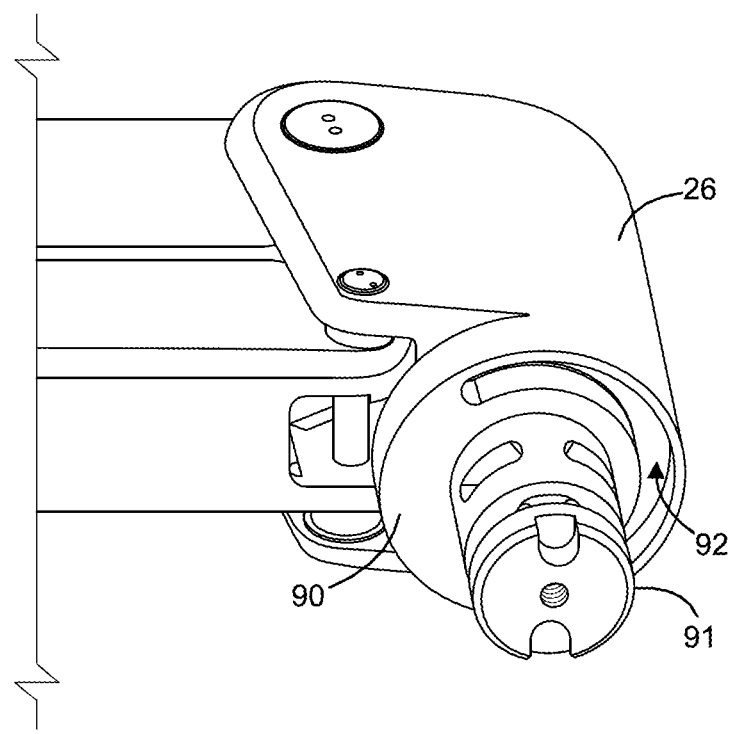
FIG. 11 is a bottom perspective view of an embodiment of the endcap portion of the arm of the workstation shown in FIG. 1, the endcap being separated from the base portion of the workstation.
Figure 12:
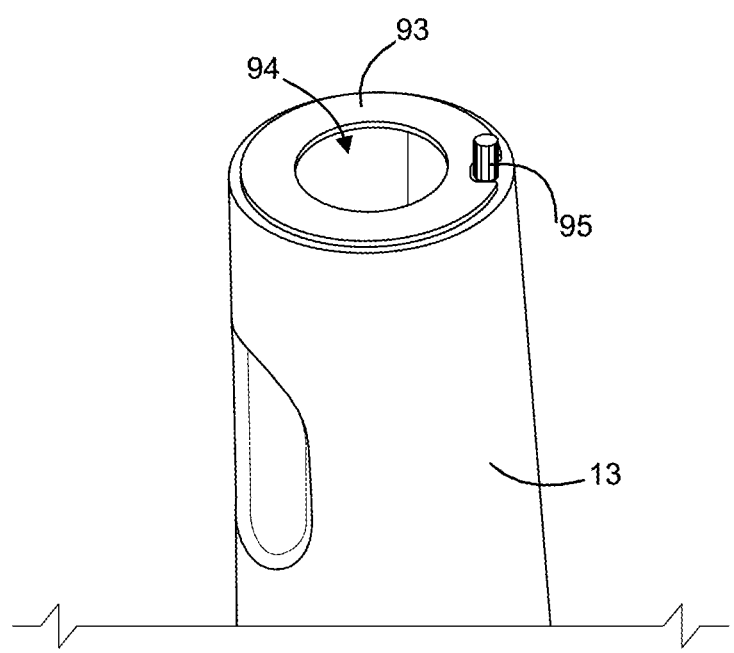
FIG. 12 is a top perspective view of an embodiment of the base portion of the workstation shown in FIG. 1, the base being separated from the endcap shown in FIG. 11.

FIGS. 11 and 12 illustrate an embodiment of the workstation 10 where the base 12 and arm portion 18 connect. Referring to FIG. 11, the second endcap 26 includes a circular bottom surface 90, a post 91 extending downwardly from the bottom surface 90, and a semi-annular groove 92 extending into the second endcap 26 from the bottom surface 90. The semi-annular groove 92 is located on one side of the bottom surface 90 and between the post 91 and the outer edge of the bottom surface 90. Referring to FIG. 12, the pole 13 of the base 12 includes an annular upper surface 93 that defines a socket 94 extending into the pole 13 from the annular upper surface 93. The pole 13 also includes a stop post 95 extending upwardly from the annular upper surface 93. The socket 94 of the pole 13 is sized and shaped to receive the post 91 of the second endcap 26, and the semi-annular groove 92 of the second endcap 26 is sized and shaped to receive the stop post 95 such that when the second endcap 26 is fitted into the pole 13 of the base 12, the upper surface 93 of the pole 13 abuts the bottom surface 90 of the second endcap 26. The stop post 95 and the semi-annular groove 92 are sized and shaped to limit the rotational freedom of the second endcap 26 about the pole 13 of the base 12. For instance, in the embodiment shown in FIGS. 11 and 12, the stop post 95 and the semi-annular groove 92 are sized and shaped to limit the rotation of the endcap 26 to 180 degrees about the pole 13 of the base 12.

While the principles of the present disclosure have been described above in connection with preferred embodiments, it is to be clearly understood that this description is made only by way of example and not as a limitation of the scope of the disclosure or the invention claimed herein.

The invention claimed is:

1. A sit-stand workstation comprising:
   a base mount that is supportable from a support surface;
   a base portion that extends upwardly from the base mount;
   an articulating arm portion connected at a first end thereof to the base portion, the articulating arm portion comprising an upper channel, a lower channel, a first endcap, and a second endcap connected together in a parallelogram shape, and an extending and retracting actuator connected between one of the upper channel and the lower channel and one of the first endcap and the second endcap, the extending and retracting actuator having a locked configuration and an unlocked configuration;
   a workstation portion attached to a second end of the articulating arm portion, the workstation portion comprising at least one column, at least one worksurface attached to the column, and at least one display support apparatus attached to the column, the at least one display support apparatus including a display support bracket for supporting an electronic display; and
   a release mechanism connected between the workstation portion and the extending and retracting actuator, wherein the release mechanism can be actuated to place the extending and retracting actuator in the unlocked configuration, such that a height position of the workstation portion can be adjusted by a user;
   wherein the base portion includes a post extending from an upper surface thereof and the first end of the articulating arm includes a groove formed in the bottom surface thereof, and wherein the groove is sized and shaped to interface with the post to allow rotation of the first end of the articulating arm about the base portion within a predetermined degree of rotational freedom.

2. The sit-stand workstation of claim 1, wherein the extending and retracting actuator is a gas cylinder.

3. The sit-stand workstation of claim 1, further comprising a toggle arm connected to the release mechanism, the toggle arm being configured to actuate the release mechanism such that when the toggle arm is moved to a first position, the extending and retracting actuator is placed in an unlocked position, and when the toggle arm is moved to a second position, the extending and retracting actuator is placed in a locked position.

4. The sit-stand workstation of claim 3, further comprising a first detent extending from the workstation portion and a second detent extending from the workstation portion, the first detent being sized and shaped to abut the toggle arm and arrest movement of the toggle arm when the toggle arm is in the first position, and the second detent being sized and shaped to abut the toggle arm and arrest movement of the toggle arm when the toggle arm is in the second position.

5. The sit-stand workstation of claim 1, wherein the second end of the articulating arm portion is pivotable about a vertical axis.

6. The sit-stand workstation of claim 1, wherein the articulating arm portion is adapted to enable the second end to be positioned below the first end.

7. A sit-stand workstation comprising:
a base that extends upwardly from a support surface;
an arm including a first end, a second end, and an elongate body extending between the first and second ends, the first end being connected to the base, the arm being configured to adjust a height of the second end from the support surface between a raised position and a lowered position, the height of the second end at the raised position being greater than the height of the second end at the lowered position;
an extending and retracting actuator having a proximal end, a distal end, and an adjustable length between the proximal end and the distal end, the proximal end being connected to the first end of the arm and the distal end being connected to the second end of the arm, the extending and retracting actuator being extendable and retractable between a first length and a second length; and
a workstation portion attached to the second end of the arm, the workstation portion comprising at least one worksurface, at least one display support bracket adapted to support an electronic display therefrom, and a manually operated toggle arm operably connected to the extending and retracting actuator, the toggle arm enabling a user to switch the extending and retracting actuator between a locked configuration and an unlocked configuration, the unlocked configuration allowing the extending and retracting actuator to move between the first and second positions;
wherein the first length of the extending and retracting actuator corresponds to the raised position of the second end of the arm and the second length of the extending and retracting actuator corresponds to the lowered position of the second end of the arm; and
wherein the workstation portion includes at least one detent for abutting the toggle arm and arresting movement of the toggle arm when the toggle arm is in one of the locked configuration and the unlocked configuration.

8. The sit-stand workstation of claim 7, wherein the arm comprises an upper channel, a lower channel, a first endcap, and a second endcap connected together in a parallelogram shape, the first endcap being located at the first end of the arm and the second endcap being located at the second end of the arm.

9. The sit-stand workstation of claim 8, wherein the proximal end of the extending and retracting actuator is connected to the first endcap and the distal end of the extending and retracting actuator is connected to the lower channel.

10. The sit-stand workstation of claim 7, wherein the extending and retracting actuator comprises a gas cylinder.

11. The sit-stand workstation of claim 7, wherein the at least one detent includes a first detent that is sized and shaped to receive a portion of the toggle arm, the first detent being configured to hold the toggle arm in the unlocked configuration.

12. The sit-stand workstation of claim 11, wherein the at least one detent further includes a second detent that is sized and shaped to receive a portion of the toggle arm, the second detent being configured to hold the toggle arm in the locked configuration.

13. The sit-stand workstation of claim 12, wherein the workstation portion includes a wall having a slot formed therein, and the toggle arm extends through the slot of the wall and terminates at a toggle handle.

14. The sit-stand workstation of claim 13, wherein the first detent comprises a first notch located on a first end of the slot of the wall, and the second detent comprises a second notch located on an opposing second end of the slot of the wall.

15. The sit-stand workstation of claim 14, wherein the workstation includes at least one spring that biases the toggle arm toward one of the first notch and the second notch.

16. The sit-stand workstation of claim 11, wherein the toggle arm is connected to a release cable that extends through the elongate body of the arm, wherein the release cable actuates the extending and retracting actuator to move from the locked configuration to the unlocked configuration when the toggle arm is moved to the first detent.

17. The sit-stand workstation of claim 7, wherein the base includes an upper surface with a post extending upwardly therefrom and the first end of the arm includes a bottom surface with a groove formed therein, the groove being sized and shaped to interface with the post to limit rotation of the first end of the articulating arm about the base portion within a predetermined degree of rotational freedom.

18. A sit-stand workstation comprising:
a base that extends upwardly from a support surface, the base including a base mount for attaching to a support surface and a pole extending upwardly from the base mount;
an articulating arm comprising an upper channel, a lower channel, a first endcap, and a second endcap connected together in a parallelogram shape, the second endcap being pivotally attached to the upper end of the pole of the base, the articulating arm being configured to articulate about the second endcap to adjust a height of the first endcap between a raised position and a lowered position, the raised position having a height from the support surface that is greater than a height of the lowered position;
a gas cylinder having a first end and a second end, the first end being connected to the lower channel and the second end being connected to the second endcap, the gas cylinder being extendable and retractable between a first position and a second position, the first position corresponding to the raised position of the first endcap and the second position corresponding to the lowered position of the first endcap, the gas cylinder including a depressible release pin for switching the gas cylinder between a locked configuration and an unlocked configuration, wherein the locked configuration prevents the gas cylinder from moving between the first and second positions and the unlocked configuration allows the gas cylinder to move between the first and second position;

a workstation portion attached to the first endcap of the articulating arm, the workstation portion comprising at least one column, at least one worksurface attached to the at least one column, a tray attached to the at least one worksurface, and at least one display support apparatus attached to the at least one column, the at least one display support apparatus being adapted to support an electronic display therefrom;

a toggle arm connected to the workstation portion, the toggle arm having a handle end and an operating end opposite the handle end, the toggle arm extending through a slot formed in the tray with the handle end of the toggle arm being located outside of the tray and the operating end of the toggle arm being located inside the tray, the slot of the tray including a first notch and a second notch, each of the first notch and the second notch being sized and shaped to receive and hold a portion of the toggle arm therein; and a release mechanism comprising a release cable and a release arm, the release arm being located proximate to the release pin of the gas cylinder and the release cable extending from the tray of the workstation portion through the articulating arm to the second end of the gas cylinder, the release cable connected to the operating end of the toggle arm at a first end and the release arm at a second end;

wherein the gas cylinder is in the locked configuration when the toggle arm is located in the first notch, and wherein the operating end of the toggle arm places the release cable in tension when the toggle arm is moved from the first notch to the second notch, thereby causing the release cable to pull the release arm toward and depress the release pin of the gas cylinder, placing the gas cylinder in the unlocked configuration.

* * * * *